(12) United States Patent
Lin

(10) Patent No.: US 6,230,584 B1
(45) Date of Patent: May 15, 2001

(54) BICYCLE PEDAL

(76) Inventor: Wen-Hwa Lin, No. 812, Chang Shen Rd., Tian San Chun, Wei Pu Hisang, Taichung Hsien (TW)

( * ) Notice: Subject to any disclaimer, the term of this patent is extended or adjusted under 35 U.S.C. 154(b) by 0 days.

(21) Appl. No.: 09/506,329

(22) Filed: Feb. 18, 2000

(51) Int. Cl.$^7$ .............................. B62M 3/08; G05G 1/14
(52) U.S. Cl. ............................................ 74/594.6
(58) Field of Search .................. 74/594.4, 594.6; 36/131

(56) References Cited

U.S. PATENT DOCUMENTS

| | | | |
|---|---|---|---|
| 4,947,708 | * | 8/1990 | Lacombe ............................. 74/594.6 |
| 5,048,369 | * | 9/1991 | Chen .................................. 74/594.6 |
| 5,259,270 | * | 11/1993 | Lin ..................................... 74/594.4 |
| 5,634,383 | * | 6/1997 | Lin ..................................... 74/594.6 |
| 5,848,560 | * | 12/1998 | Lin ..................................... 74/594.6 |
| 6,112,620 | * | 9/2000 | Chen ................................. 74/594.6 |

FOREIGN PATENT DOCUMENTS

| | | | |
|---|---|---|---|
| 2266687 | * | 11/1993 | (GB) ................................... 74/594.6 |
| 2-74490 | * | 3/1990 | (JP) .................................... 74/594.6 |

* cited by examiner

Primary Examiner—David A. Bucci
Assistant Examiner—Chong H. Kim
(74) Attorney, Agent, or Firm—Varndell & Varndell, PLLC

(57) ABSTRACT

A bicycle pedal includes a pedal frame having a H-shaped receiving chamber and a rear opening, a clamping member pivoted to the pedal frame for holding down a rubber block on the pedal frame, the clamping member having a protruding rod inserted through the rear opening into the receiving chamber, a compression spring mounted in the receiving chamber and stopped at one side of the protruding rod to hold the clamping member in engagement with the loaded rubber block, an adjustment block mounted in the receiving chamber and stopped at one end of the compression spring, and an adjustment screw rotated to move the adjusting block in adjusting the spring power of the compression spring.

3 Claims, 6 Drawing Sheets

BICYCLE PEDAL

BACKGROUND AND SUMMARY OF THE INVENTION

The present invention relates to a bicycle pedal, and more particularly to such a bicycle pedal, which enables the rider to load the rubber block at the sole of the shoe onto the pedal frame quickly.

FIG. 1 shows a bicycle pedal according to the prior art. This structure of bicycle pedal comprises a hollow pedal frame, a clamping member pivoted to the pedal frame for clamping on a rubber block loaded on the pedal frame, and a coil spring connected between one end of the clamping member and a barrel on a screw rod in the pedal frame. This structure of bicycle pedal has drawbacks. One drawback of this structure of bicycle pedal is the complicated structure of the hollow pedal frame. Another drawback of this structure of bicycle pedal is the complicated installation procedure of the screw, the barrel, and the coil spring. Furthermore, the coil spring wears quickly with use. When the coil spring starts to wear, the clamping member may not be able to positively hold down the loaded rubber block.

According to one aspect of the present invention, the bicycle pedal comprises a pedal frame having a receiving chamber, a clamping member pivoted to the pedal frame for holding down a rubber block on the pedal frame, and a spring member mounted in the receiving chamber to hold the clamping member in the clamping position. Accoding to another aspect of the present invention, an adjustment block is mounted inside the receiving chamber and stopped at one end of the spring member, and an adjustment screw is installed in the pedal frame and rotated to move the adjustment block in adjusting the spring power of the spring member.

DETAILED DESCRIPTION OF THE PREFERRED EMBODIMENT

Figure 1:
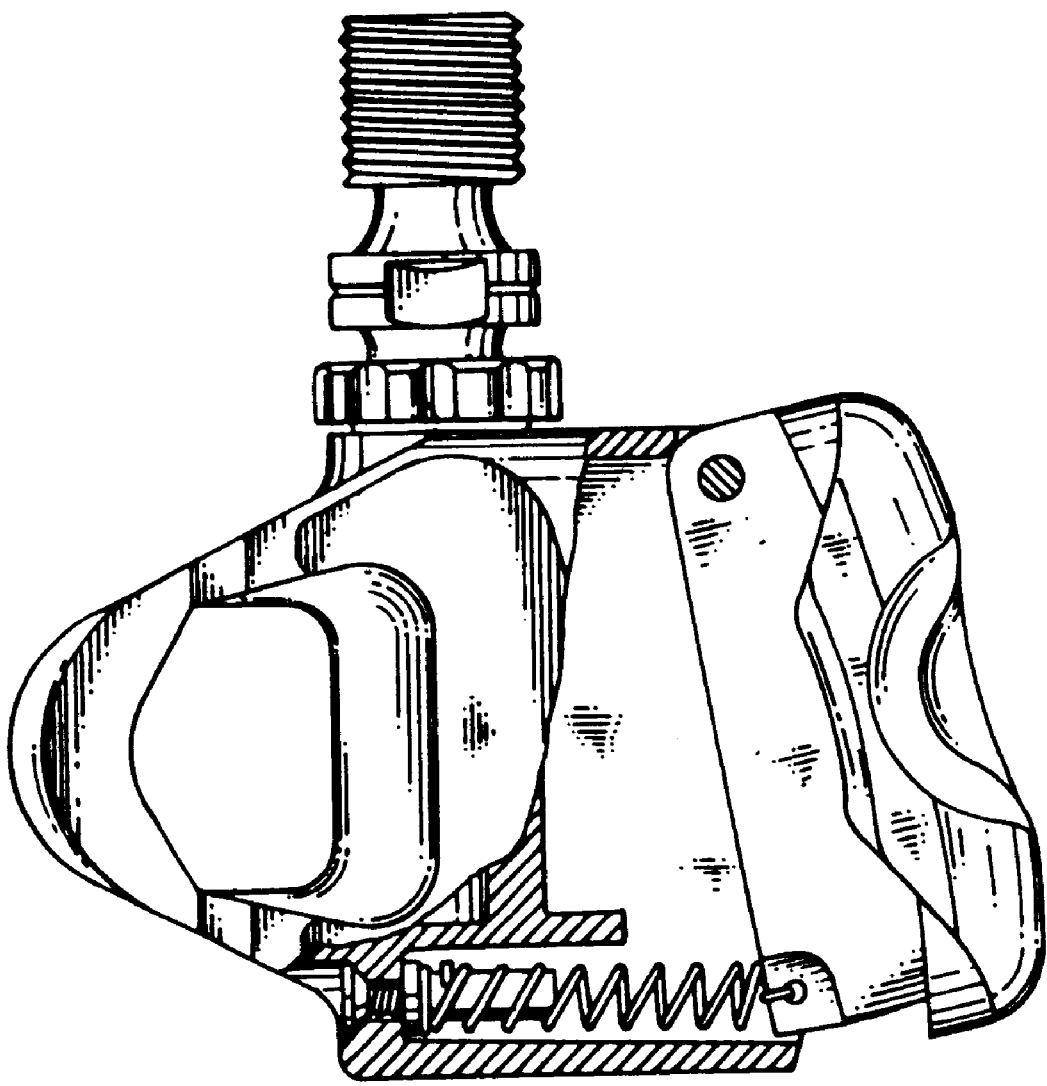
FIG. 1 is a sectional assembly view of a bicycle pedal according to the prior art.
Figure 2A:
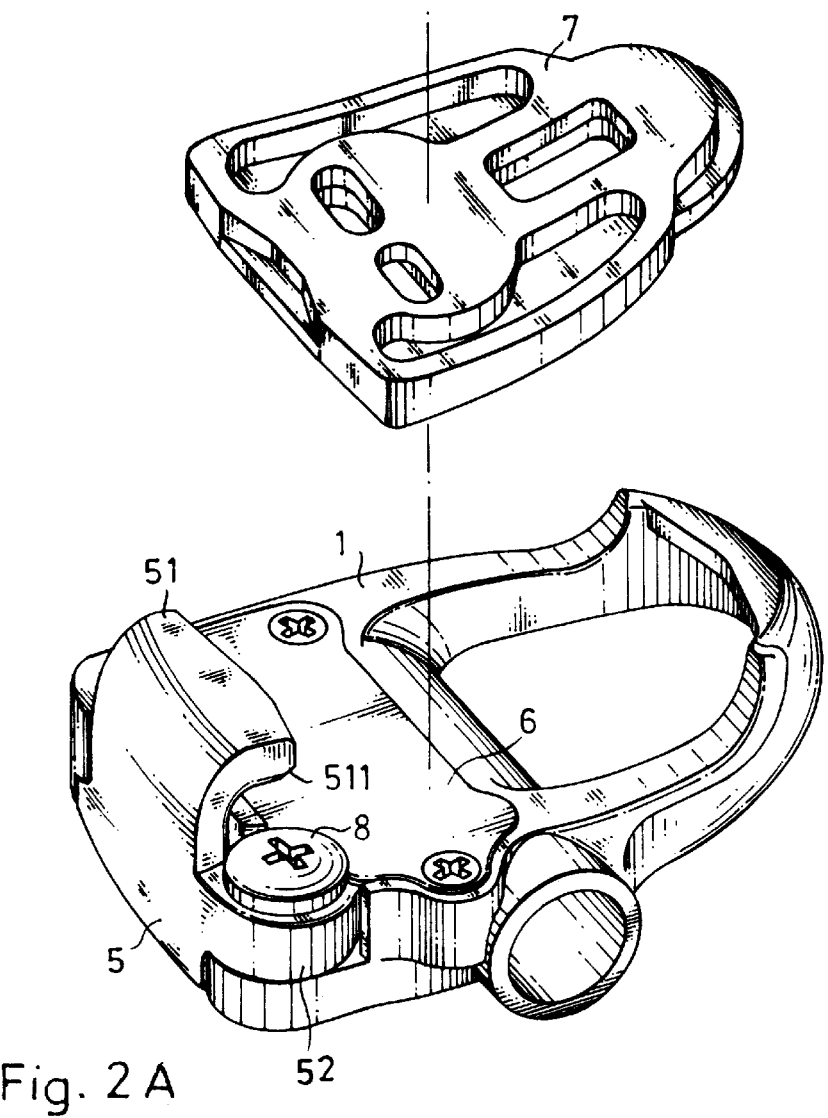
FIGS. 2 and 2A illustrate bicycle pedal according to the present invention.
Figure 2:
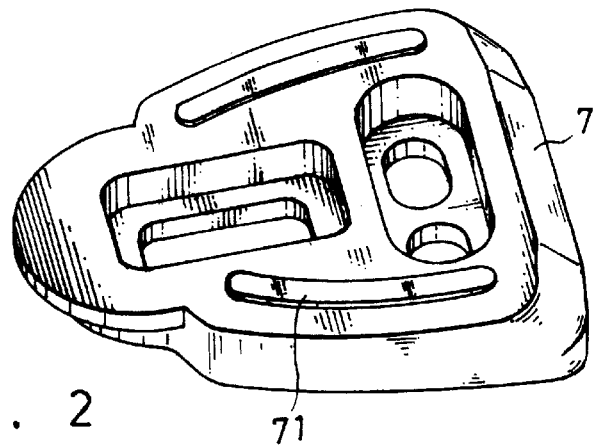
Figure 3:
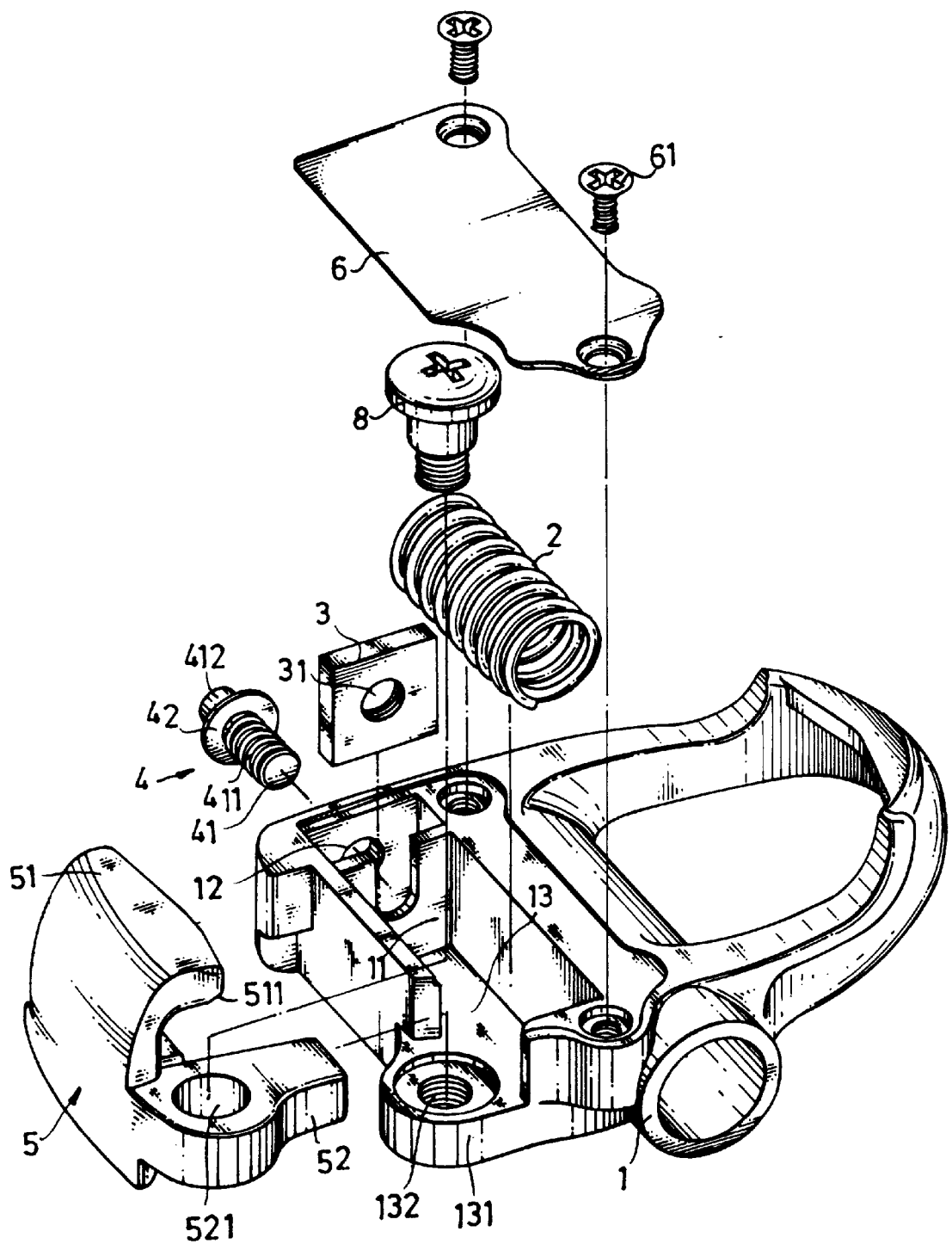
FIG. 3 is an exploded view of the bicycle pedal shown in FIG. 2.
Figure 4:
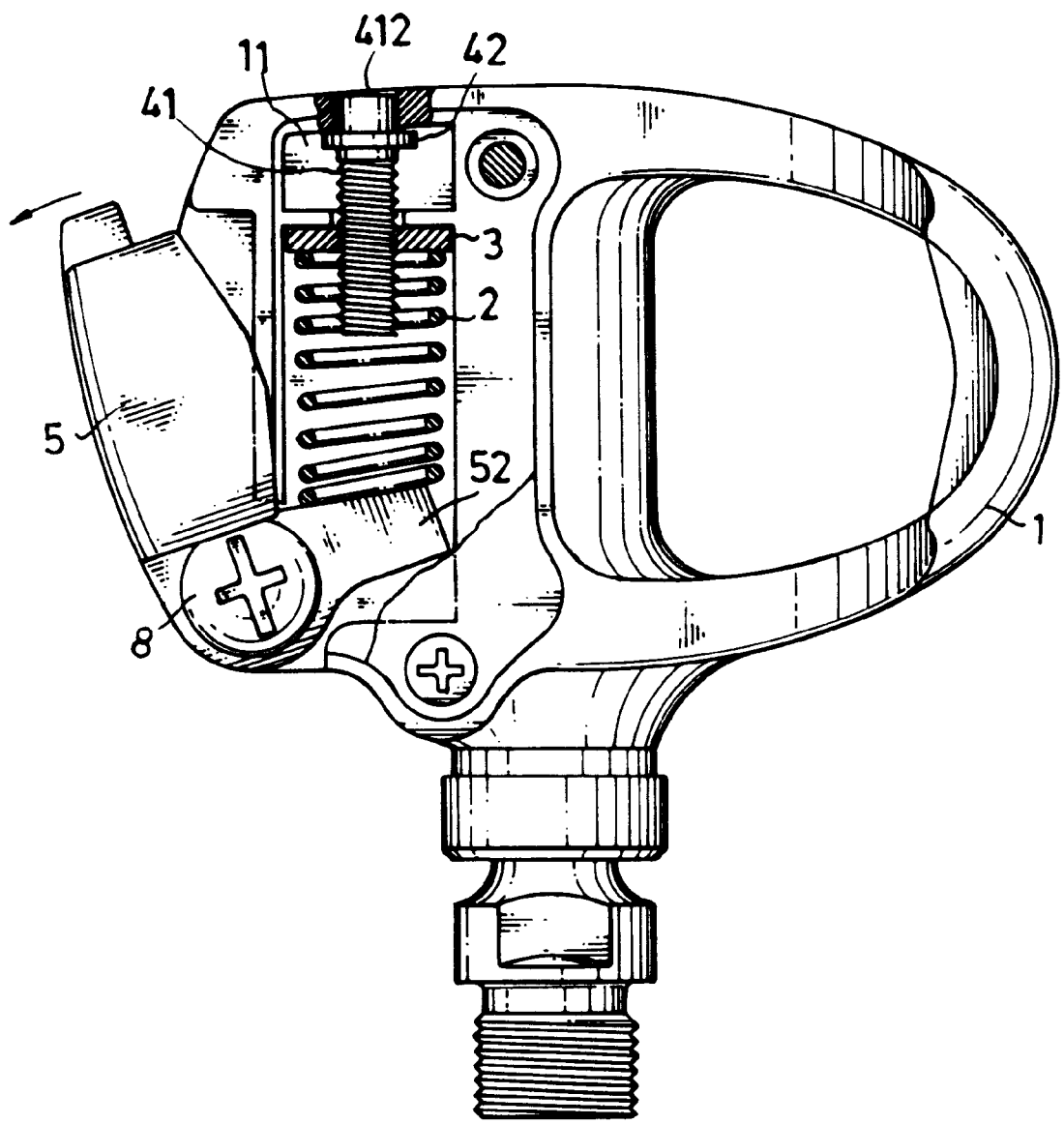
FIG. 4 is a sectional view of the bicycle pedal showing the clamping member turned outwards according to the present invention.

Referring to FIGS. 2 through 4, a bicycle pedal in accordance with the present invention is shown comprised of a pedal frame 1, a spring member 2, an adjustment block 3, an adjustment screw 4, a clamping member 5, and a cover plate B.

The pedal frame 1 is designed for the mounting of a rubber block 7, having a conical front side, a substantially H-shaped receiving chamber 11 near the rear side thereof, a horizontal axle hole 12 through on vertical side wall thereof in communication with the H-shaped receiving chamber 11, an opening 13 in one corner of the rear side in communication with the receiving chamber 11, a protruding flanges 131 extended from the rear side in one corner, and a vertical screw hole 132 on the protruding flange 131. The receiving chamber 11 is divided into a small space, which receives a part of the adjustment screw 4, and a big space, which receives the adjustment block 3 and the spring member 2. The spring member 2 is a compression spring mounted inside the receiving chamber 11, having one end stopped at the adjustment block 3, and an opposite end stopped against a protruding rod 52 of the clamping member 5. The adjustment block 3 is a flat, rectangular member mounted inside the receiving chamber 11 at one side, having a center screw hole 31 for receiving the adjustment screw 4. The adjustment screw 4 comprises a shank 41, and a collar 42 rose around the periphery of the shank 41 and received in the small space in the receiving chamber 11. The shank 41 has an outer thread 411 around the periphery of one end thereof, and a socket hole 412 on the other end thereof. The outer thread 411 of the shank 41 of the adjustment screw 4 is threaded into the screw hole 31 on the adjustment block 3. After installation of the adjustment screw 4 in the receiving chamber 11, one end of the shank 41 is inserted into the horizontal axle hole 12 on the pedal frame 1. The clamping member 5 is a substantially L-shaped block comprising an upwardly extended clamping wall 51 terminating in a sloping conical face 511 for holding down one rubber block 7, a forward protruding rod 52 inserted throug the opening 13 on the pedal frame 1 into the receiving chamber 11 and stopped at one end of the spring member 2, and a through hole 521 disposed between the clamping wall 51 and the protruding rod 52 and connected to the screw hole 132 on the protruding flange 131 of the pedal frame 1 by a screw 8. The cover plate 6 is covered on the receiving chamber 11, and fixedly fastened to the pedal frame 1 by screws 61.

After installation of the spring member 2, the adjustment block 3 and the adjustment screw 4 in the receiving chamber 11 in the pedal frame 1, the protruding rod 52 is inserted through the opening 13 into the receiving chamber 11 in the pedal frame 1, and the screw 8 is inserted through the through hole 521 and threaded into the screw hole 132 to secure the clamping member 5 to the pedal frame 1, enabling the clamping member 5 to be turned about the screw 8 within a limited angle.

Figure 5:
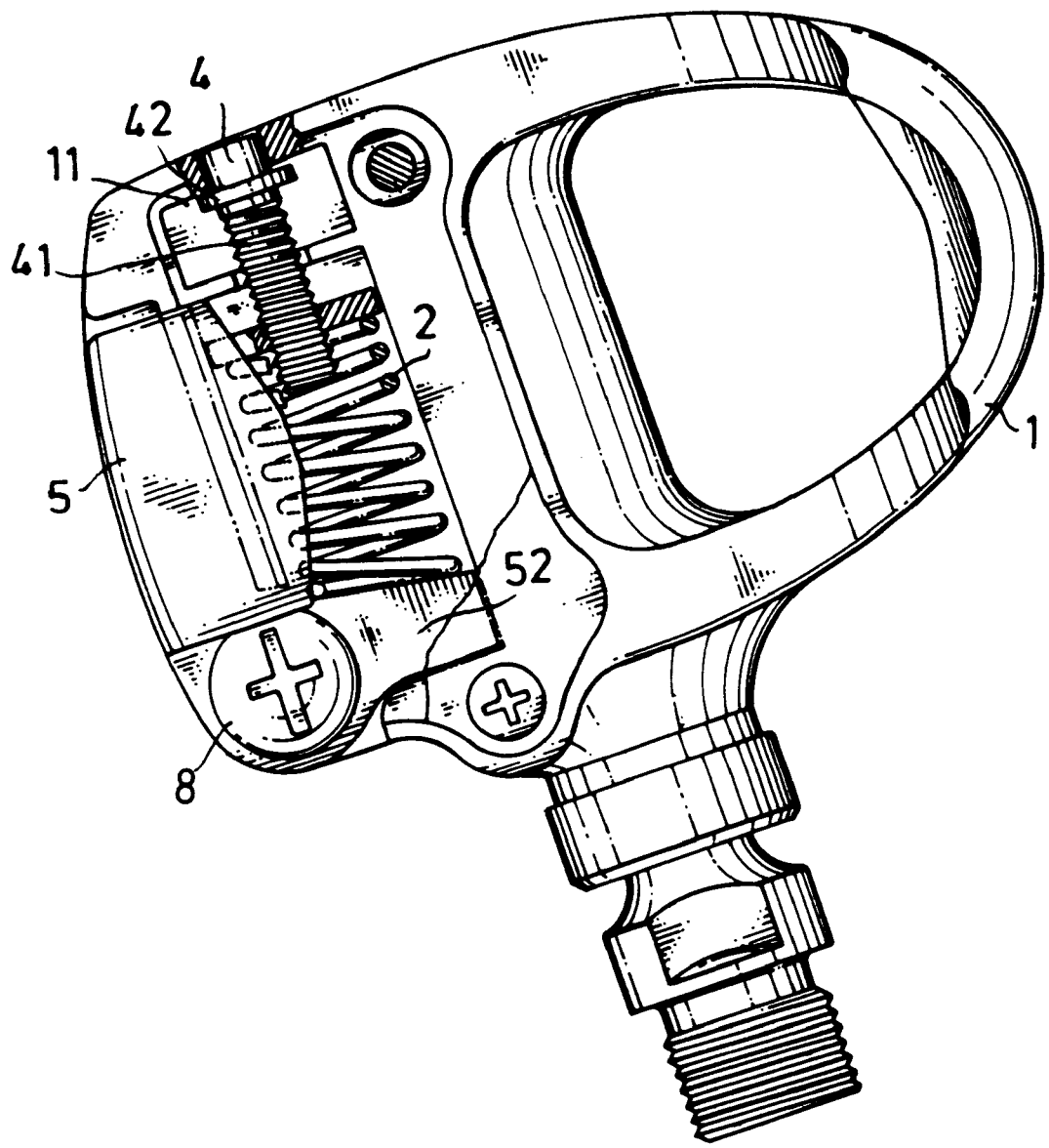
FIG. 5 is another sectional view of the present invention, showing the spring power of the spring member adjusted.
Figure 6:
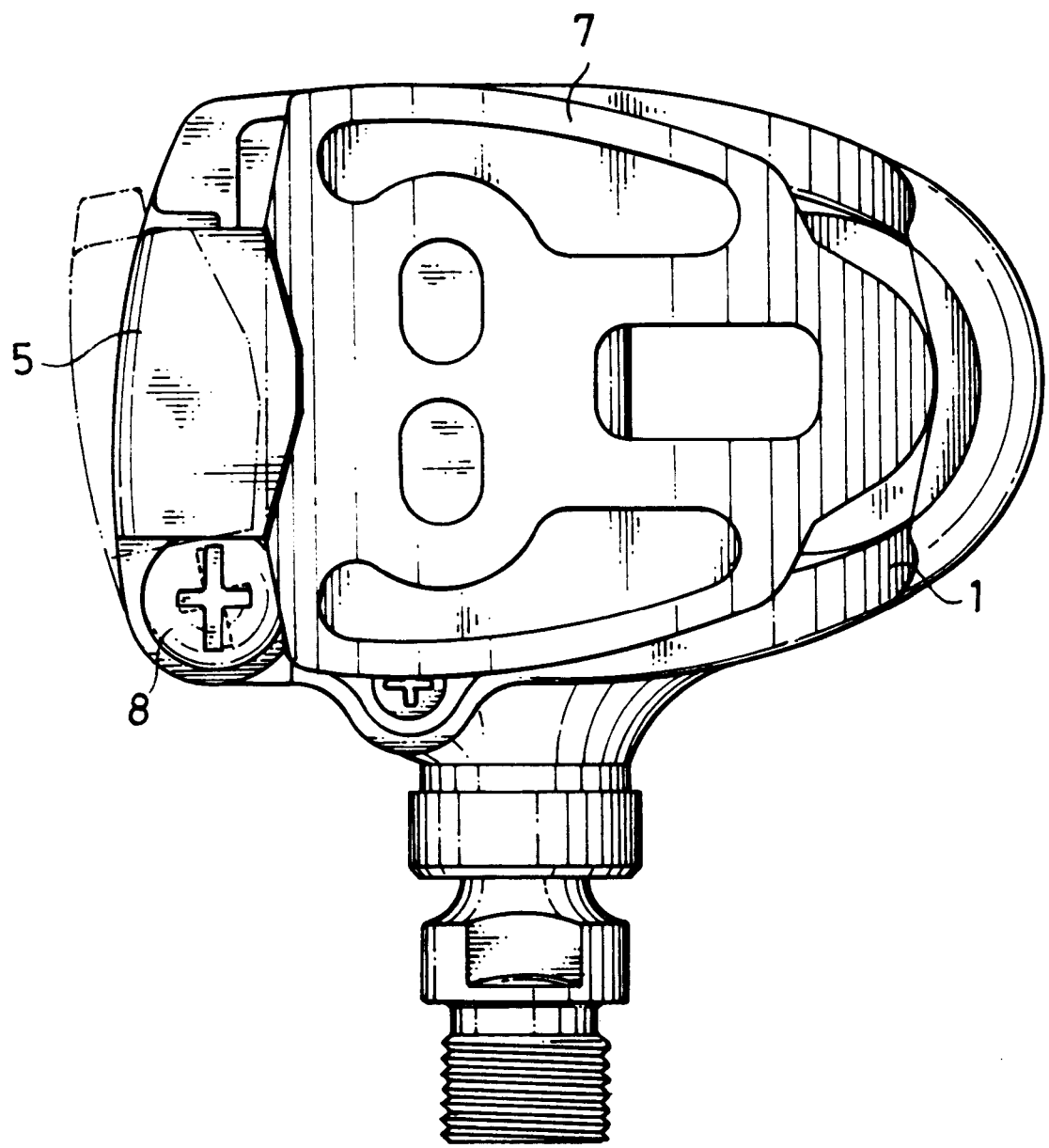
FIG. 6 is an applied view of the present invention, showing the loading of a rubber block on the pedal frame.

Referring to FIGS. 5, 6 and 4 again, when securing the rubber block 7 to the pedal frame 1, the rubber block 7 is put into the pedal frame 1 from the top or one side to force the clasping member 5 outwards, and then set into position. After the rubber block 7 has been set into position, the spring member 2 is released from the pressure and returned to its former shape, thereby causing the clamping member 5 to be returned to its former position and clamped on the rubber block 7. Because the clamping wall 51 of the clamping member 5 has a sloping conical face 511, the clamping member 5 can smoothly be forced into engagement with the rubber block 7, and the rubber block 7 can be quickly and conveniently disengaged for the clamping member 5. Further, rotating the adjustment screw 4 causes the adjustment block 3 to be moved forwards or backwards in the receiving chamber 11 to adjust the spring power of the spring member 2 relatively.

Referring to FIG. 2, the rubber block 7 has two protruding contact portions 71 for direct contact with the surface of the pedal frame 1 to minimize friction between the rubber block 7 and the pedal frame As indicated above, the present invention uses a compression spring to support the clamping member in position, and an adjustment screw and an adjustment block to adjust the spring power of the compression spring. When the compression spring starts to wear, the spring power of the compression spring can still be adjusted to the workable level.

What is claimed is:

1. A bicycle pedal comprising:
   a pedal frame, said pedal frame comprising substantially H-shaped receiving chamber near a rear side thereof, a horizontal axle hole through on vertical side wall thereof in communication with said H-shaped receiving chamber, an opening in one corner of the rear side in communication with said receiving chamber, a protruding flange extended from the rear side in one corner, and a vertical screw hole on said protruding flange;
   a substantially L-shaped clamping member pivoted to said pedal frame for clamping a rubber block on said pedal frame, said clamping member comprising an upwardly extended clamping wall terminating in a sloping conical face for holding down a rubber block on said pedal frame, a forward protruding rod inserted through the opening on said pedal frame into one end of said receiving chamber, and a through hole disposed between said clamping wall and said protruding rod and pivoted to the screw hole on the protruding flange of said pedal frame by a screw;
   a spring member mounted in said receiving chamber inside said pedal frame and stopped at one side of the protruding rod of said clamping member in a clamping position;
   a adjustment block mounted in said receiving chamber inside said pedal frame and stopped against one end of said spring member opposite to the protruding rod of said clamping member;
   a adjustment screw installed in said pedal frame and rotated to move said adjustment block relative to said spring member; and
   a cover plate fastened to said pedal frame and covered on said receiving chamber.

2. The bicycle pedal of claim 1 wherein said receiving chamber of said pedal frame is divided into a small space, which receives a part of said adjustment screw, and a big space, which receives said adjustment block, said spring member and said protruding rod of said clamping member.

3. The bicycle pedal of claim 2 wherein said adjustment screw comprises a threaded shank having one end inserted into the horizontal axle hole on said pedal frame and an opposite end threaded into a screw hole on said adjustment block, a collar raised around said threaded shank and stopped at an inside wall inside said receiving chamber of said pedal frame, and a socket hole disposed on one end of said threaded shank in said horizontal axle hole.

* * * * *